Nov. 20, 1923.
H. CROWLEY
SHOCK ABSORBER
Filed April 11, 1922
1,474,578
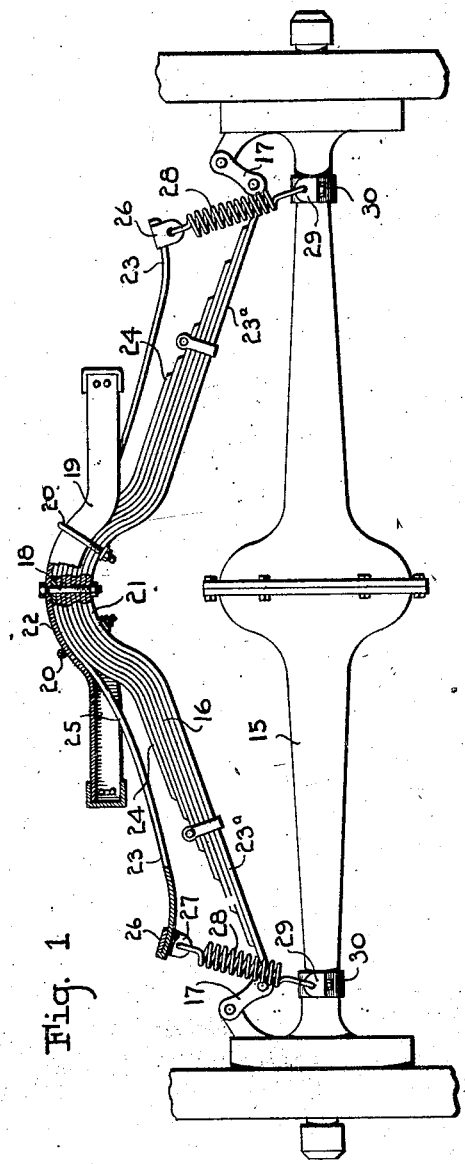
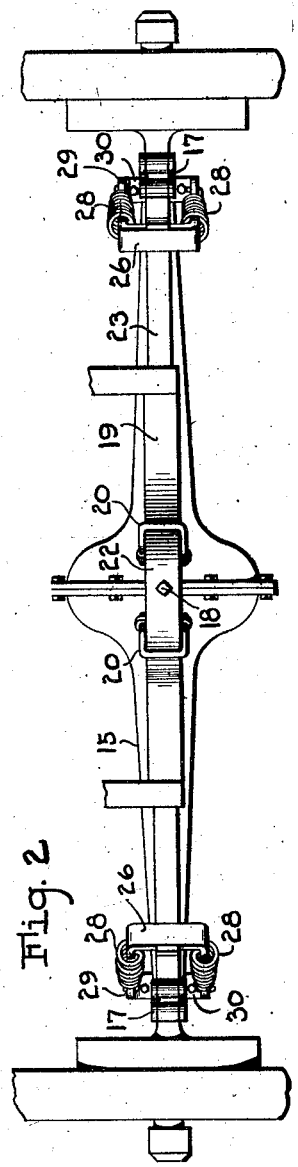
Hamp Crowley
INVENTOR
WITNESSES
BY
ATTORNEY Patented Nov. 20, 1923.

1,474,578

UNITED STATES PATENT OFFICE.

HAMP CROWLEY, OF VALDOSTA, GEORGIA.

SHOCK ABSORBER.

Application filed April 11, 1922. Serial No. 551,458.

*To all whom it may concern:*

Be it known that I, HAMP CROWLEY, a citizen of the United States, residing at Valdosta, in the county of Lowndes and State of Georgia, have invented a new and useful Shock Absorber, of which the following is a specification.

This invention relates to shock absorbers for vehicle springs, and has for its object the provision of a shock absorber which will lessen the shocks to the mechanical parts of the automobile, maintain the body and chassis reasonably steady at all times, save the vehicle springs from breakage and prolong the life of the mechanical parts of the car. This will be especially noted where the shock absorber is applied to a light car, since the added tension of the shock absorber between the body and the axles eliminates the rebound and absorbs shock when the car passes over rough places.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawing:—

Figure 1 is a longitudinal view of the shock absorber, partly in elevation and partly in section, applied to a rear spring.

Figure 2 is a plan view of the same.

As shown in the drawing, 15 designates the rear axle housing; and 16, a rear vehicle spring connected by means of shackles 17, to the rear axle housing 15. The central portion of the spring 16 is perforated, and through the perforation is passed a bolt 18 for securing the leaves of spring 16 together and likewise forming part of the connecting means between the rear vehicle spring and the rear end 19 of the channel frame of an automobile. A clip 20 further binds the vehicle spring 16 at its curved central portion 21 to the curved central portion 22 of the rear end member 19 of the channel frame. All these elements just described refer to parts of the rear construction of the well known "Ford" type of automobile.

A leaf spring 23, which is identical in structure with the longest leaf spring 23ª of the vehicle spring 16, with certain necessary modifications in shape, is secured centrally upon the shortest upper leaf 24 of the vehicle spring 16.

The leaf spring 23 is bent upwardly, as at 25, to space the spring from the upper leaf spring 24, and has secured at its ends U-shaped brackets 26, in any approved manner. The brackets have downwardly turned perforated ears 27 which are engaged by eyes formed on the upper ends of coiled springs 28. A pair of these coiled springs are located upon opposite sides of the vehicle spring 16, as shown in Fig. 2, and have their lower ends provided with eyes to engage upstanding perforated ears 29 formed on collars 30 which are clamped on the rear axle housing 15.

In the ordinary car, when the road wheels meet with an obstruction or pass over rough places, the vehicle springs will tend to rise and lift the body of the vehicle unnecessarily and subsequently the springs will rebound, lowering the body almost to the same extent to which the body has been elevated. The movements of the vehicle springs will therefore cause an injurious vibration and a constant jarring of the mechanical parts of the automobile in attempting to return to an equilibrium. In the construction shown, when the body is elevated, the leaf springs 23 of Fig. 1, in cooperation with their respective coiled springs 28, will tend to resist the upward movement of the body and the action of the respective vehicle springs of the vehicle, and upon the rebound, the same leaf springs and coiled springs will likewise tend to resist the downward movement. This constant flexible resistance to the action of the vehicle springs will serve to maintain the springs in equilibrium and also prevent the rebound of the vehicle body and the vehicle springs and thereby absorb the shocks incident to rough road traveling. The side sway will also be taken care of in the same way.

What is claimed is:—

1. In combination, a vehicle spring and a shock absorber comprising a spring leaf secured to the center of the vehicle spring and spaced from the same except at the point of attachment, a pair of U-shaped brackets having their intermediate portions secured transversely to the respective ends of the spring leaf and with their legs depending, collars secured to the axle of the vehicle and having upstanding ears opposed to the legs of the brackets, each of said ears being connected to the corresponding leg by a coiled spring, said coiled springs straddling the aforementioned vehicle spring.

2. The combination with a vehicle spring and axle, of a shock absorber comprising a spring leaf connected to the vehicle spring intermediate its ends and secured jointly with the spring to a fixed part of the vehicle, said spring leaf being spaced from the vehicle spring from its point of connection to its ends, a pair of U-shaped brackets having their intermediate portions secured transversely to the respective ends of the spring leaf and with their legs depending, collars secured to the axle and having upstanding ears opposed to the legs of the brackets, and coiled springs connecting said ears to the respective bracket legs and straddling the vehicle spring.

3. The combination with a vehicle spring and axle, of a spring leaf arranged above the vehicle spring and in the same vertical plane, means for rigidly securing the spring leaf at its central portion to the vehicle spring, the remaining portions of the spring leaf being spaced from the vehicle spring and extending outwardly toward the ends of the spring, a pair of U-shaped brackets having their intermediate portions secured transversely to the respective ends of the spring leaf and with their legs depending, and coiled springs connected respectively to each leg of each bracket and also connected to the axle.

4. The combination with a vehicle frame, spring and axle, of a spring leaf interposed between the frame and the spring at the center, means for rigidly securing the spring leaf to the vehicle spring at this point, said spring leaf being inverted but arranged in the same vertical plane with the vehicle spring and having substantially the same length as the vehicle spring, a transverse attaching member secured to each end of the spring leaf and having depending legs, and coiled springs connecting said legs to the axle of the vehicle and straddling the vehicle spring.

In testimony that I claim the foregoing as my own I have hereto affixed my signature.

HAMP CROWLEY.